United States Patent
Krug-Kussius

(10) Patent No.: US 7,565,915 B2
(45) Date of Patent: Jul. 28, 2009

(54) FEED PRESSURE VALVE

(75) Inventor: Karl Krug-Kussius, Karsbach (DE)

(73) Assignee: Bosch Rexroth AG, Stuttgart (DE)

( * ) Notice: Subject to any disclaimer, the term of this patent is extended or adjusted under 35 U.S.C. 154(b) by 259 days.

(21) Appl. No.: 10/573,703

(22) PCT Filed: Sep. 20, 2004

(86) PCT No.: PCT/DE2004/002097

§ 371 (c)(1),
(2), (4) Date: May 2, 2006

(87) PCT Pub. No.: WO2005/033566

PCT Pub. Date: Apr. 14, 2005

(65) Prior Publication Data

US 2006/0266419 A1    Nov. 30, 2006

(30) Foreign Application Priority Data

Oct. 1, 2003    (DE) ................. 103 45 712

(51) Int. Cl.
*F16K 31/22* (2006.01)
(52) U.S. Cl. .................... 137/491; 137/492.5
(58) Field of Classification Search ............. 137/491, 137/492, 492.5, 513.3, 533.19, 533.31
See application file for complete search history.

(56) References Cited

U.S. PATENT DOCUMENTS

| 3,090,398 | A | * | 5/1963 | Adams | 137/491 |
| 3,952,771 | A | * | 4/1976 | Lang | 137/491 |
| 4,289,160 | A | * | 9/1981 | Kawasaki et al. | 137/491 |
| 4,351,356 | A | * | 9/1982 | Koiwai et al. | 137/491 |
| 4,531,543 | A | * | 7/1985 | Markley | 137/515.7 |
| 5,655,567 | A | * | 8/1997 | Mikel | 137/513.3 |
| 2003/0094201 | A1 | | 5/2003 | Slawinski et al. | |

FOREIGN PATENT DOCUMENTS

| DE | 43 04 796 A1 | 8/1994 |
| DE | 101 20 643 A1 | 5/2002 |
| DE | 101 45 975 A1 | 8/2002 |
| EP | 0 908 653 A | 4/1999 |
| EP | 1 312 843 A | 5/2003 |

* cited by examiner

*Primary Examiner*—Stephen M Hepperle
*Assistant Examiner*—William McCalister
(74) *Attorney, Agent, or Firm*—Oliff & Berridge, PLC

(57) ABSTRACT

What is disclosed is a pilot-controlled pressure feed valve comprising a main stage and a pilot control stage, wherein the main stage comprises a piston that is biased into a closed position. The piston is provided with a piston bore through which an input port may be connected with a rear-side spring chamber. To this piston bore a throttle valve means is associated which provides a comparatively small cross-section of flow for the control oil in the pressure limiting function of the pressure feed valve, and a comparatively large cross-section of flow in the anti-cavitation function.

15 Claims, 3 Drawing Sheets

FEED PRESSURE VALVE

The invention concerns a pressure feed valve in accordance with the preamble of claim 1.

The like pressure feed valves are employed, e.g., as an operation valve in hydrostatic drives, for example travelling and rotating gear drives, and for securing linear consumers, such as cylinders in the open or closed hydraulic circuit. In the case of travelling/rotating gear drives these valves are used, e.g., in order to open a connection from the high-pressure side to the low-pressure side when a predetermined system pressure is exceeded. In the process, pressure medium is then conveyed past a hydraulic motor of the rotating/travelling gear drive from the high-pressure branch into the low-pressure branch, so that pressure peaks in the high-pressure branch may be avoided. In the anti-cavitation function—such as during downhill travel —pressure medium may then be replenished from the low-pressure branch (which in this case actually is conducting a higher pressure) into the high-pressure branch, whereby cavitation may be prevented.

In DE 101 20 643 A1 and DE 101 45 975 A1 generic pilot-controlled pressure feed valves are disclosed, wherein a main stage is executed with a piston that is biased by a compression spring into a closed position in which the connection from an end surface-side pressure port to a low-pressure port (tank) having the form of radially arranged bores is blocked.

A spring chamber of the main stage is adapted to be connected with a control oil drain port via a pilot control stage. This pilot control stage comprises a pilot control valve body which is biased by means of a control spring into a closed position in which the pressure medium flow path between the spring chamber and the control oil drain port is blocked.

The piston of the main stage has an axially extending bore whereby the spring chamber is connected with a pressure chamber that is delimited by the end face of the piston and in which the system pressure is present. When a pre-set system pressure is exceeded, the pilot control valve body is raised from its pilot control valve seat against the force of the control spring, so that control oil may flow off from the spring chamber via the pilot control stage. This control oil flow generates a pressure drop across the axial bore of the piston, so that the piston rear side is correspondingly relieved of load and the connection between the end surface-side pressure port and the radial low-pressure port is controlled open against the force of the compression spring: the regulating piston assumes a regulating position in which the system pressure is limited to the pre-set maximum value. In order to minimize the control oil flow across the pilot control stage, it is desired to design the axial bore of the piston as small as possible. A small axial bore of the piston does, however, have the drawback that in the anti-cavitation function the control oil is impeded in flowing off from the spring chamber via the axial bore to the axially extending high-pressure port, so that the piston rear side is relieved of pressure comparatively slowly, and the replenishing process is introduced with a delay. Such delays are, however, not acceptable in highly dynamic alternating loads of the travelling gear, for in order to avoid cavitations it is necessary to be able to very quickly switch over to the anti-cavitation function. It was furthermore found that in the conventional solutions, erratically running travelling gear motors may occur in the reversing operation of the travelling gear motor owing to the slow switching function.

The invention is based on the object of furnishing a pressure feed valve wherein the pilot control oil flow rate in the pressure limiting function is minimum, and the piston rear side may rapidly be relieved of load in the anti-cavitation function.

This object is achieved through a pressure feed valve having the features of claim 1.

In accordance with the invention, the pressure feed valve is provided with a throttle valve means which is executed such that in the pressure limiting function a comparatively small cross-section is made available for the control oil flow through the piston, whereas in the anti-cavitation function a comparatively large cross-section is effective which ensures a rapid reduction of load on a spring chamber of a main stage of the pressure feed valve.

In a particularly preferred embodiment, the throttle valve means is formed by a throttle check valve that is integrated into the piston. The throttle check valve comprises a nozzle plate penetrated by a nozzle bore which has a smaller diameter than the piston bore. The nozzle plate is adapted to be taken into contact with a nozzle plate seat, so that the effective cross-section of the piston bore is determined by the cross-section of the smaller nozzle bore. In the anti-cavitation function, the nozzle plate rises from the nozzle plate seat and may be encompassed by the control oil flow, so that not the smaller nozzle bore but the larger piston bore is effective as the cross-section of flow.

In a preferred variant of the invention, it is preferred if the diameter of the nozzle bore is half the effective diameter of the piston bore at the most.

The bypass flow around the nozzle plate is optimized if it is provided at its circumference with flattenings which delimiting a cross-section of bypass flow.

In a particularly preferred variant of the invention, the nozzle plate has the form of an approximately triangular base, at the corner ranges of which supporting legs extending in the direction of opening are provided. These supporting legs may in the anti-cavitation function be taken into contact against a stop shoulder of the piston bore, so that a very large cross-section of bypass flow is made available that is limited by two respective adjacent supporting legs, the afore-mentioned flattening, and the adjacent outer circumference of the piston bore. In one solution having a particularly simple construction, the throttle check valve is inserted into an expanded part of the piston bore, wherein a seat sleeve screwed into the latter constitutes the nozzle plate seat.

The pressure feed valve in accordance with the invention may be used in closed or open hydraulic circuits including fixed/variable displacement motors or fixed/variable displacement pumps.

Further advantageous developments of the invention are subject matter of further subclaims. In the following a preferred embodiment of the invention shall be explained in more detail by referring to schematic drawings, wherein:

FIG. 1 shows a view of a longitudinal section through a pilot-controlled pressure feed valve 1, the basic construction of which is known from DE 101 45 975 A1 and DE 101 20 643 A1, so that hereinbelow merely those components essential for an understanding of the present invention shall be discussed, while for the rest reference is made to the afore-mentioned patent specifications.

Figure 1:
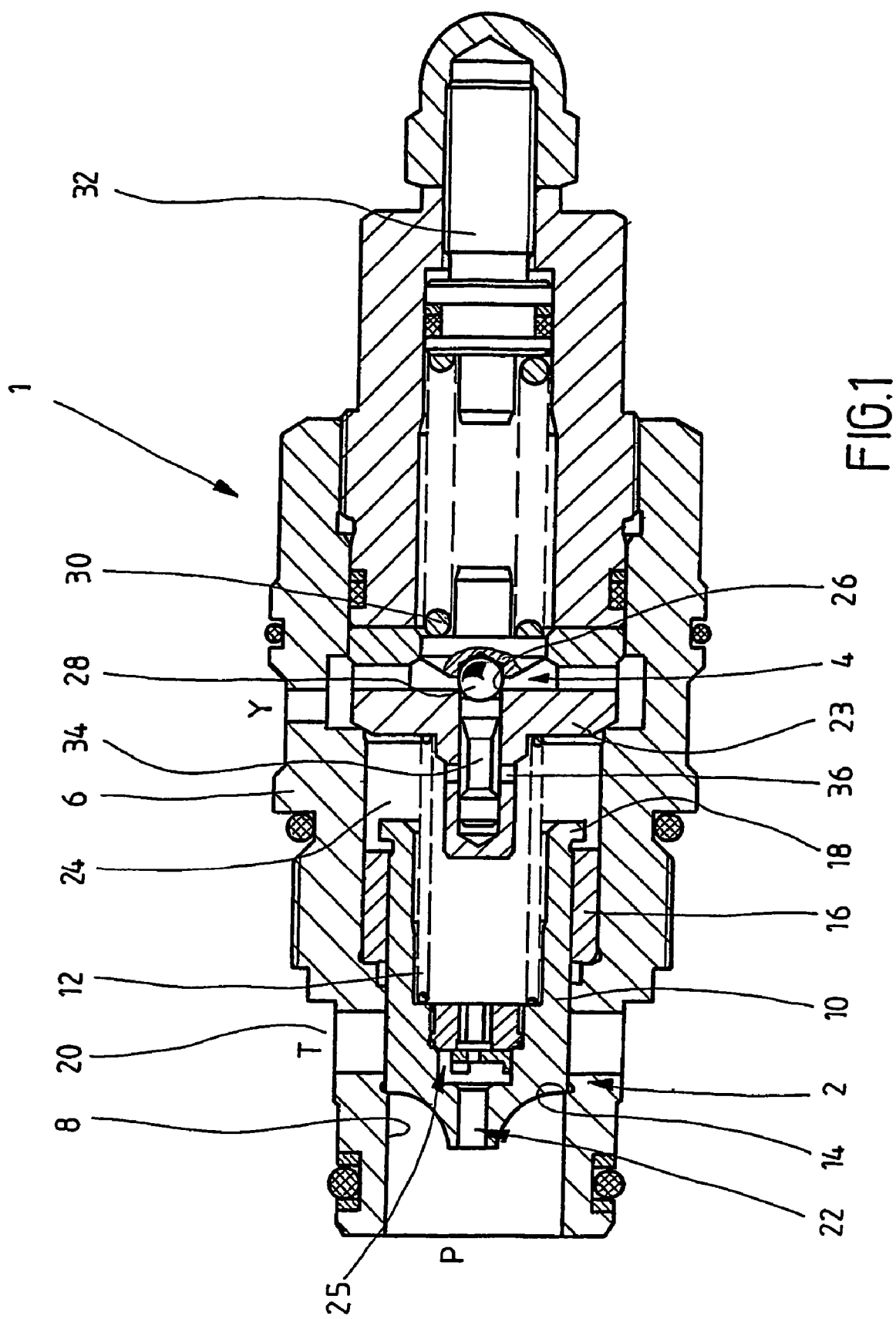
FIG. 1 is a view of a longitudinal section through a pressure feed valve in accordance with the invention.

The pressure feed valve 1 comprises a main stage 2 and a pilot control stage 4 that are formed in a cartridge-type housing 6. The latter has an axial port P connected, e.g., with the high-pressure side of a travelling gear drive. An output port T formed by radially arranged bores is connected with the low-pressure side of the hydraulic system.

The housing is penetrated by an axial bore 8 in which a piston 10 of the main stage is guided in an axially movable manner. The latter is designed with a sliding seat, with the piston 10 being biased against an annular shoulder 14 of the axial bore through the intermediary of a compression spring 12. The piston 10 is thus designed to have a surface area difference in the closed position, with the end face effective in the direction of opening being smaller than the end face effective in the direction of closing.

The end portion of the piston 10 that is removed from the port P is encompassed by an anti-cavitation ring 16 adapted to be taken into contact against a rear-side stop collar 18 of the piston 10. This anti-cavitation ring 16 is subjected at the end surface to the pressure at the tank port (low-pressure side) via a parallel bore of the radially arranged bores 20.

The piston 10 has the form of a hollow piston and is penetrated by a piston bore 22 that is expanded in a step shape towards the right (FIG. 1). In this piston bore 22 a throttle check valve 25 is provided, the construction of which shall be explained in more detail in the following.

The compression spring 12 plunges with portions thereof into the radially expanded part of the piston bore 22 and is supported on a reducing member 23 which forms an end face-side of a spring chamber 24.

On the right-hand end face of the reducing member 23 (view of FIG. 1) a pilot control valve seat 26 for a spherical pilot control valve body 28 is formed. The latter is biased by a control spring 30 into its closed position against the pilot control valve seat 26. The bias of the control spring 30 may be altered by means of a set screw 32 for adjustment of the system pressure.

The reducing member 23 has a hub-shaped projection plunging into the spring chamber 24, in which a blind bore is formed, the opening of which constitutes the afore-mentioned valve seat 26. In this blind bore a small attenuation piston 34 is guided in an axially movable manner, which may be taken into contact with the pilot control valve body 28. The blind bore is connected with the spring chamber 24 via radial bores 36. The right-hand end portion of the small attenuation piston 34 (view of FIG. 1) is guided with radial play, so that between the inner circumference wall of the blind bore and the outer circumference of the small attenuation piston 34 an annular attenuation gap is formed. As is explained in depth in DE 101 45 975 A1, this small attenuation piston 34 brings about a halfwave-type attenuation which enables rapid opening and attenuated closing of the pilot control stage 4.

The pressure chamber following the pilot control valve seat 26 on the right in FIG. 1 is connected via an external control oil port Y with the tank, or the low-pressure side. Instead of this external port, this pressure chamber may also be connected internally with the tank port T wherein, e.g., a longitudinal bore is provided in the housing 6.

Figure 2:
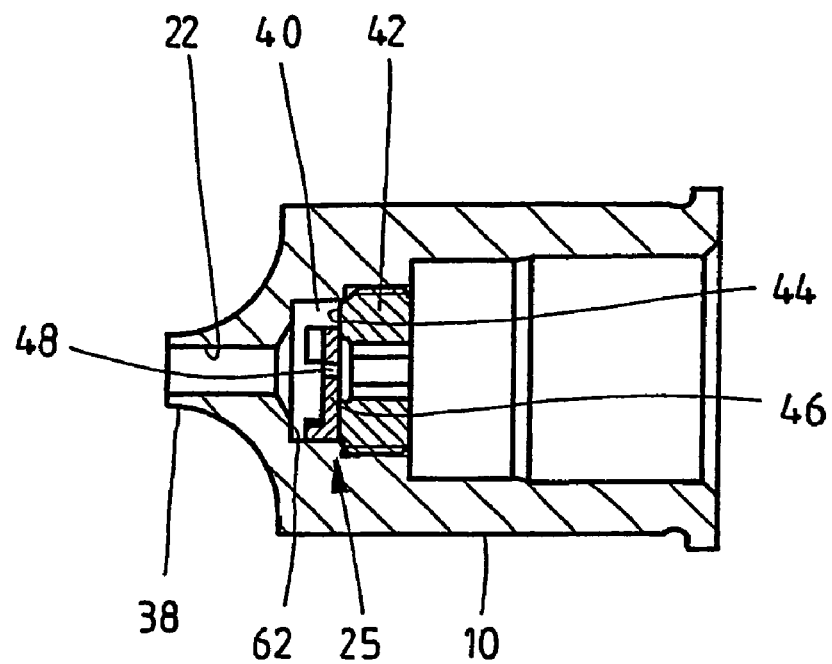
FIGS. 2 and 3 are detail representations of the pressure feed valve of FIG. 1, and FIGS. 4a and 4b show the pressure feed valve of FIG. 1 in different operating states.

FIG. 2 shows a detail representation of the piston 10 of the main stage 2. Accordingly, the left-hand end face of the piston 10 (view of FIG. 2) is executed with a projection 38 into which the piston bore 22 opens. The latter is expanded in a step shape to the right (view of FIG. 2), where following the piston bore 22 a valve chamber 40 is formed in which the throttle check valve 25 is received. Into this valve chamber 40 a seat sleeve 42 is screwed, the front (left in FIG. 2) end face of which has the form of a seat surface 44. The valve member of the throttle check valve 25 is formed by a nozzle plate 46 penetrated by a nozzle bore 48. The latter has a substantially smaller diameter than the piston bore 22 opening in the range of the projection 38.

Figure 3:
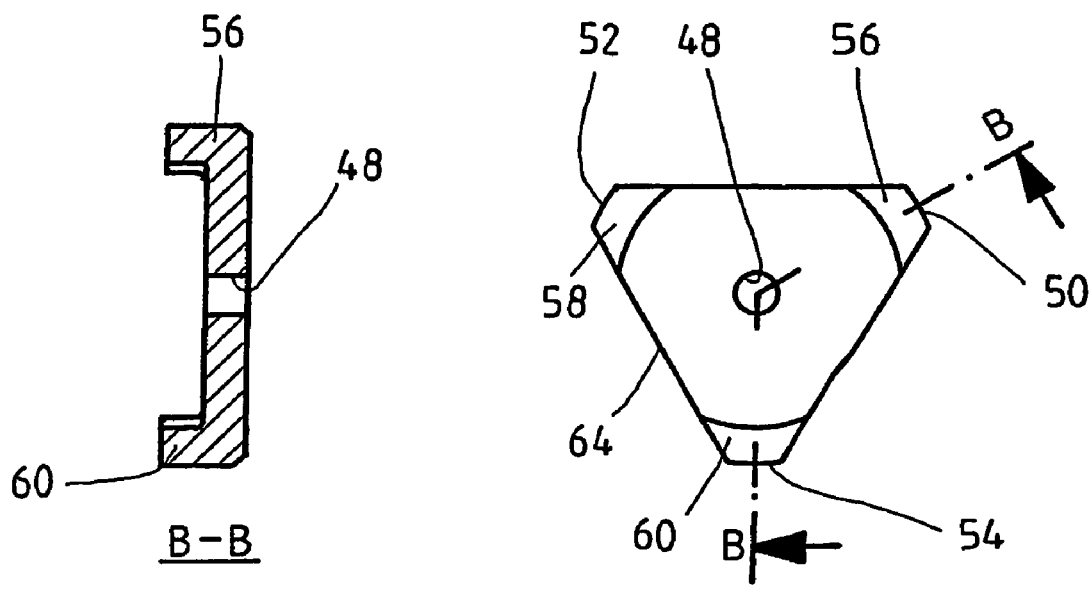

FIG. 3 shows an end view from the left of the nozzle plate 46 in FIG. 2 and a sectional view along line B-B. Accordingly, it has a somewhat triangular end face with rounded corner ranges 50, 52, 54, the radius of curvature of which approximately corresponds to the radius of the valve chamber 40, so that these corner ranges slidingly contact the inner circumference wall. The nozzle bore 48 is formed in the center of this triangle structure.

The corner ranges 50, 52, 54 are provided with supporting legs 56, 58, 60 extending towards the left-hand annular end surface 62 (view of FIG. 2) of the valve chamber 40. As shall be explained in more detail in the following, these supporting legs 56, 58, 60 enter into contact with the annular end surface 62 when the throttle check valve 25 is opened, so that in the event of a control oil flow from the spring chamber 24 to the piston bore 22 the nozzle plate 46 is encompassed in the flow, with this bypass flow taking place along the flattenings forming the triangle structure (side edges) 64 and between two respective adjacent legs 54, 56; 56, 52 and 52, 54.

The minimum cross-section of flow for the control oil is determined by the diameter of the nozzle bore 48 when the throttle check valve 25 is closed, and by the diameter of the substantially larger piston bore 22 when the throttle check valve 25 is opened. In the represented embodiment, this diameter is at least twice the diameter of the nozzle bore 48, so that its throttling effect is substantially higher. The cross-section of flow of the radial bores 36 is also selected to be larger than that of the nozzle bore 48.

In the basic position of the anti-cavitation valve 1 represented in FIG. 1, the piston 10 is biased into its closed position, the pilot control stage 4 is closed, and the nozzle plate 46 of the throttle check valve 25 sealingly rests on the seat surface 44 of the seat sleeve 42, so that control oil may enter from the end surface-side port P through the nozzle bore 48 into the spring chamber 24. Owing to the area difference of the piston 10, the latter is biased into its closed position by the effective pressure force equivalent in addition to the force of the compression spring 12.

Figure 4A:
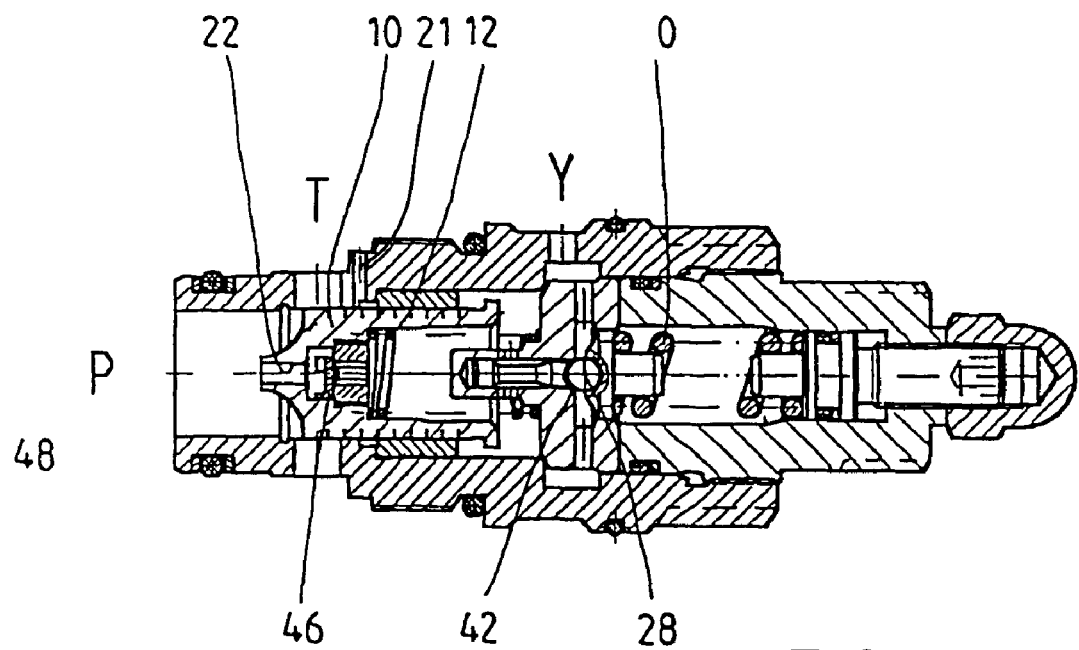

In the event of a pressure increase at port P, the pressure in the spring chamber 24 correspondingly also rises, so that approximately this pressure also acts at the pilot control valve seat 26. If the pre-set system pressure is exceeded, the pilot control valve body 28 is raised from the pilot control valve seat 26 against the force of the control spring 30, so that control oil may flow off from the spring chamber 24 via the opened pilot control stage 4 towards the tank T. Owing to the resulting load relief of the rear side of the piston 10 the latter rises from the annular shoulder 14, so that the connection from P to T is controlled open. The piston 10 assumes a regulating position wherein the system pressure at port P is limited to the set maximum value. The nozzle plate 46 is pressed against the seat surface 44, so that the control oil flow is determined by the diameter of the comparatively small nozzle bore 48. I.e., the control oil flow rate in the pressure limiting function of the pressure feed valve 1 is very low, so that in the case of closed circuits merely this small amount of control oil and the motor leakage must be supplied. This operating state is represented in FIG. 4a).

Figure 4B:
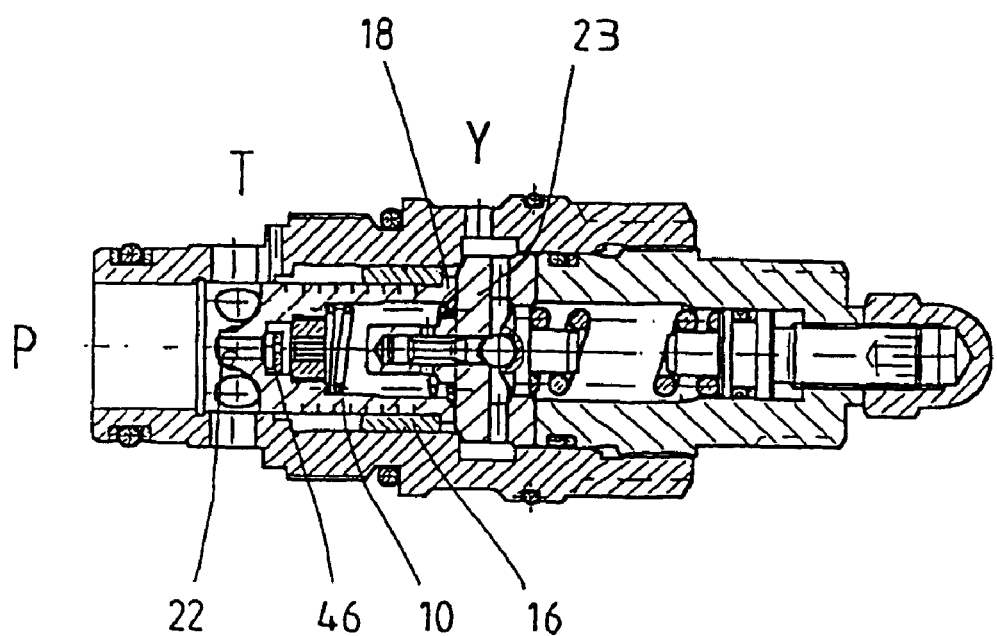

In the anti-cavitation function, i.e., when the pressure at port P drops below the pressure at port T (see FIG. 4b)), the anti-cavitation ring 16 is initially shifted to the right by the higher pressure at port T acting on its left-hand end face until it contacts the stop collar 18, and the piston 10 is raised from the annular shoulder 14 and contacts the adjacent end face of the reducing member 23—the connection from port T to port P is completely opened, so that pressure medium may be replenished. Owing to the low pressure at port P, the nozzle plate 46 is raised from the seat sleeve 42 in the anti-cavitation function, so that the spring chamber 24 is very rapidly relieved of load via the piston bore 22, wherein the raised nozzle plate 46 is encompassed by the flow, so that the nozzle bore 48 does not take effect. Opening of the throttle check valve 25 ensures rapid switching to the anti-cavitation function, so that cavitations may reliably be avoided.

When the pressure conditions are reversed again, i.e., when the pressure at port P rises above the pressure at port T, the piston 10 is again returned into its closed position, with this closing movement being attenuated by the effect of the nozzle plate including the small nozzle bore 48. This temporally slow closing process of the piston 10 admits a small pressure medium quantity compensation between the ports of a hydraulic motor, so that the latter is not distorted.

As was mentioned at the outset, the pressure feed valves 1 in accordance with the invention may, e.g., be arranged in an open circuit or closed circuit, for instance in rotating gear drives, wherein a respective one of the pressure feed valves may be associated to each of the high-pressure side and the low-pressure side. Such circuits are known per se, so that explanations in this regard are not necessary.

What is disclosed is a pilot-controlled pressure feed valve comprising a main stage and a pilot control stage, wherein the main stage comprises a piston that is biased into a closed position. The piston is provided with a piston bore through which an input port may be connected with a rear-side spring chamber. To this piston bore a throttle valve means is associated which provides a comparatively small cross-section of flow for the control oil in the pressure limiting function of the pressure feed valve, and a comparatively large cross-section of flow in the anti-cavitation function.

List of Reference Symbols:
1 pressure feed valve
2 main stage
4 pilot control stage
6 housing
8 axial bore
10 piston
12 compression spring
14 annular shoulder
16 anti-cavitation ring
18 stop collar
20 radially arranged bores
22 piston bore
23 reducing member
24 spring chamber
25 throttle check valve
26 pilot control valve seat
28 pilot control valve body
30 control spring
32 set screw
34 small attenuation piston
36 radial bores
38 projection
40 valve chamber
42 seat sleeve
44 seat surface
46 nozzle plate
48 nozzle bore
50 corner range
52 corner range
54 corner range
56 supporting legs
58 supporting legs
60 supporting legs
62 annular end surface
64 flattening

The invention claimed is:

1. A pilot-controlled pressure feed valve, comprising:
a piston of a main stage, the piston being penetrated by a piston bore and capable of controlling a connection between an input port and an output port to be open;
a spring chamber adapted to be connected with the input port via the piston bore and with a control oil drain via a pilot control stage, and
a throttle valve means which throttles a control oil flow in a first direction through the piston bore from the input port into the spring chamber according to a pressure-limiting function,
wherein the throttle valve means controls open a comparatively large cross-section of flow in an anti-cavitation function in the event of a control oil flow in a second direction that opposes the first direction, and
wherein the throttle valve means is a throttle check valve having a nozzle plate which is penetrated by a nozzle bore having a smaller diameter than the piston bore, and which is adapted to be taken with an end face thereof into contact with a nozzle plate seat, wherein the nozzle bore may be bypassed by a flow around said nozzle plate in a condition where the nozzle plate is raised from the nozzle plate seat.

2. The pressure feed valve in accordance with claim 1, wherein the diameter of the nozzle bore is half the diameter of the piston bore at the most.

3. The pressure feed valve in accordance with claim 1, wherein a circumference of the nozzle plate includes flattenings which delimit a cross-section of the flow around said nozzle plate.

4. The pressure feed valve in accordance with claim 3, wherein the nozzle plate has an approximately triangular base, at the corner ranges of which supporting legs are formed which are adapted to be taken into contact with an annular end surface of the piston bore, and curved outer circumference surfaces of which are in contact against inner circumference walls of an expanded part of the piston bore.

5. The pressure feed valve in accordance with claim 1, wherein the throttle check valve is inserted into a valve chamber of the piston bore into which a seat sleeve forming the nozzle plate valve seat is inserted.

6. The pressure feed valve in accordance with claim 1, wherein the pressure feed valve is included in closed or open hydraulic circuits with fixed/variable displacement motors or pumps.

7. The pressure feed valve in accordance with claim 2, wherein a circumference of the nozzle plate includes flattenings which delimit a cross-section of the flow around said nozzle.

8. The pressure feed valve in accordance with claim 2, wherein the throttle check valve is inserted into a valve chamber of the piston bore into which a seat sleeve forming the nozzle plate valve seat is inserted.

9. The pressure feed valve in accordance with claim 3, wherein the throttle check valve is inserted into a valve chamber of the piston bore into which a seat sleeve forming the nozzle plate valve seat is inserted.

10. The pressure feed valve in accordance with claim 4, wherein the throttle check valve is inserted into a valve chamber of the piston bore into which a seat sleeve forming the nozzle plate valve seat is inserted.

11. The pressure feed valve in accordance with claim 1, wherein the pressure feed valve is included in closed or open hydraulic circuits with fixed/variable displacement motors or pumps.

12. The pressure feed valve in accordance with claim 2, wherein the pressure feed valve is included in closed or open hydraulic circuits with fixed/variable displacement motors or pumps.

13. The pressure feed valve in accordance with claim 3, wherein the pressure feed valve is included in closed or open hydraulic circuits with fixed/variable displacement motors or pumps.

14. The pressure feed valve in accordance with claim 4, wherein the pressure feed valve is included in closed or open hydraulic circuits with fixed/variable displacement motors or pumps.

15. The pressure feed valve in accordance with claim 5, wherein the pressure feed valve is included in closed or open hydraulic circuits with fixed/variable displacement motors or pumps.

* * * * *